June 20, 1967  G. D'ANGELO ET AL  3,325,896

SHEARS BLADE MOUNTING MEANS

Filed May 24, 1965  3 Sheets-Sheet 1

INVENTORS
GEORGE D'ANGELO
WILLIAM BLASNICK
BY
*James and Franklin*
ATTORNEY

June 20, 1967  G. D'ANGELO ET AL  3,325,896
SHEARS BLADE MOUNTING MEANS
Filed May 24, 1965  3 Sheets-Sheet 3
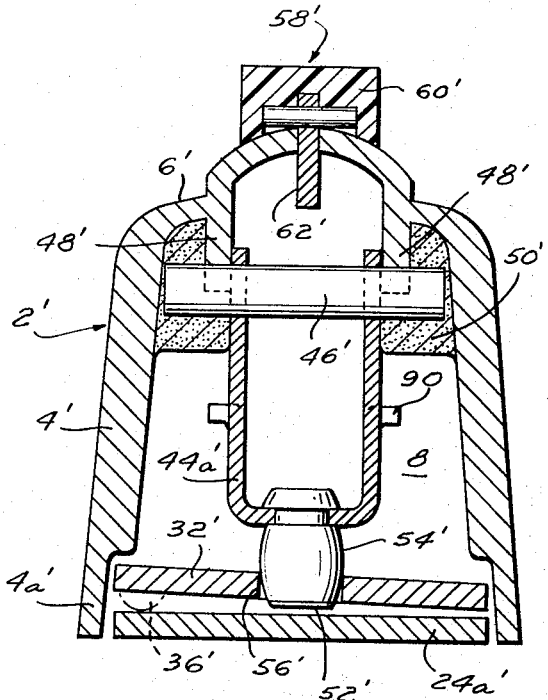
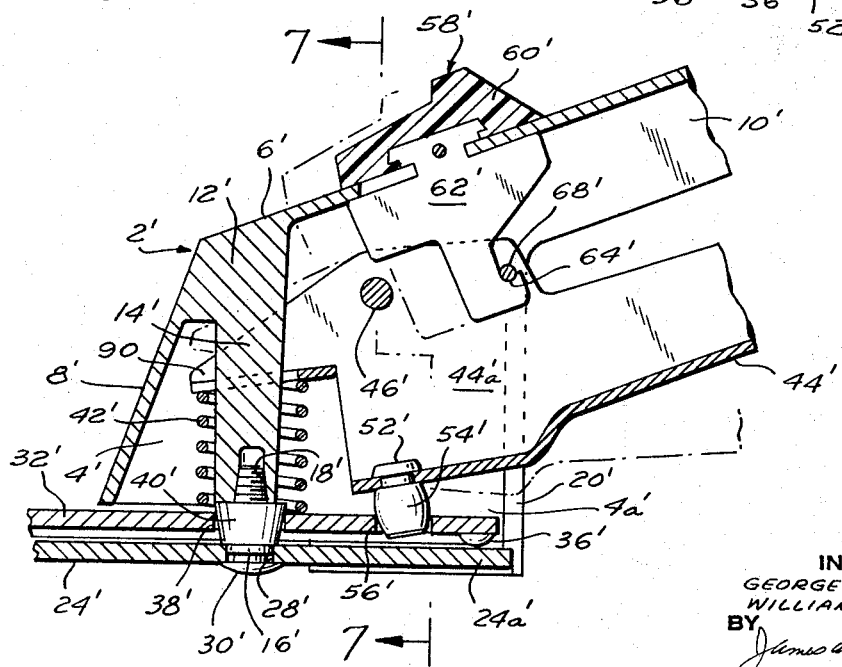
INVENTORS
GEORGE D'ANGELO
WILLIAM BLASNICK
BY
ATTORNEY

United States Patent Office 3,325,896
Patented June 20, 1967

3,325,896
SHEARS BLADE MOUNTING MEANS
George D'Angelo, Paterson, and William Blasnik, Demarest, N.J., assignors to International Patent Research Corp., New York, N.Y., a corporation of New York
Filed May 24, 1965, Ser. No. 458,163
9 Claims. (Cl. 30—248)

The present invention relates to novel means for the mounting of the blades of shears. The invention is here specifically disclosed as embodied in a shears specifically designed for the clipping of lawn grass and the like, but the applicability of the instant invention is not limited thereto.

A shears comprises two relatively movable cutting blades provided with cutting edges, the blades being moved between open and closed position and the cutting edges of the blades contacting one another at a point which moves along the length of the blades toward their tips as the blades move from open to closed position. Cutting takes place only at the point where the cutting edges of the blades engage one another. Accordingly it is essential that the blades be reliably urged toward one another so that their cutting edges tend to actually make engagement with one another. Even the smallest gap between them at the point where they should be touching will result in a marked reduction in cutting effectiveness, and if that gap should become appreciable no cutting action at all will take place. This last is particularly true if the article to be cut is itself relatively flexible (e.g. a sheet of paper or blades of grass). The existence of the gap between the blades will permit the article to be cut to bend around the cutting edge of one of the blades and enter that gap, the other blade merely sliding thereover without cutting.

On the other hand, it is desirable that the blades have some permissible play relative to one another. One reason for this is to protect the blades themselves against the accidental interposition therebetween of articles which cannot readily be cut but which could damage the blades or cause damage to the blade-actuating mechanism. Another reason is to make up for blade wear and dimensional tolerances inherent in the manufacture and assembly of the various shear parts.

To solve these problems, particularly in relatively light duty devices such as grass shears, one blade has been urged against the other by means of a spring. This arrangement, although widely used, has certain disadvantages. From a mechanical design point of view difficulty has been experienced in providing a proper mounting for the spring. Because of space limitations it has been difficult to provide a spring which is not overly stiff but which will nevertheless produce the desired results, which will, in short, press the blades against one another with sufficient force to ensure the cutting of grass while yielding to protect the shears if twigs, small branches or nails become interposed between the blades. A dense clump of grass interposed between the blades presents a particularly troublesome problem. A spring usually will not be able to differentiate between that situation and one in which a small branch or a nail is thus interposed, and consequently the blades will either tend to move away from one another too readily, destroying their cutting action with respect to grass clumps, or else they will not move away readily enough, thus not properly protecting the shears against damage.

It is the prime object of the present invention to devise a shears construction which will provide for the mounting of the blades in a fashion which is simple and inexpensive, yet will nevertheless give rise to a considerably more reliable cutting action under a wide variety of operating conditions than has heretofore been the case.

To that end the shears comprises a support housing which is located above the blades and which is provided with an integral downwardly projecting part on which at least the movable blade is mounted. The spring which urges the movable blade against the fixed blade preferably surrounds this downwardly projecting part, thus permitting the use of an elongated spring which can provide the necessary spring pressure for proper blade engagement and which will not be overstressed when abnormal cutting conditions are experienced. The support housing constitutes a mounting for the operating handles of the shears and a shield for the operating mechanism of the shears, thereby producing a device of attractive appearance and protecting the operating mechanism against the entry thereinto of extraneous objects such as pieces of cut grass which might tend to clog or impede the operating mechanism.

As an additional feature, the movable blade is provided with an aperture within which a downwardly tapered element is received, that element being supported by the downwardly projecting housing part and constituting an axis about which the movable blade moves between closed and open positions. When the movable blade meets an obstruction in moving toward closed position an edge of that blade aperture will be urged against the downwardly tapering surface of the axis element, and as the blade tends to rise in order to evade the obstruction the downwardly tapering surface of the axis element will tend to resist that rising tendency on the part of the blade, thus functioning in conjunction with the spring to retain the blades in cutting relationship. If the obstruction is too great the blade will nevertheless rise, but for obstructions of moderate strength, such as clumps of grass, the cutting action of the blades will continue.

In one embodiment here illustrated the spring which is active upon the blades to urge them into cutting relationship is separate from the spring which is active upon the handles and the blades to urge them to one extreme blade position, usually the blade-open position. In another embodiment the same spring which urges the blades into cutting engagement also serves to bias the blades and the handles to blade-open position, thus simplifying the overall construction of the shears and rendering it less expensive. This single spring construction has another advantage as the blades move toward closed position the point of cutting engagement between the blades moves away from the axis about which the movable blade pivots. Thus a greater and greater lever arm is created between the point of cutting engagement and the axis, so that less and less of a blade obstructing force is required in order to cause the blades to separate and destroy the cutting action. The arrangement in this second embodiment is such that as the blades move toward closed position the spring active on the blades to urge them into engagement is progressively compressed, thus providing at the axis of rotation of the movable blade a greater and greater force which, to a large extent, equalizes the increase in the length of the lever arm attendant upon the closing of the blades, thus producing a more uniform cutting action.

The accomplishment of the above, and to such other objects as may hereinafter appear, the present invention relates to a shears construction, and in particular to the means for mounting the blades thereon, as defined in the appended claims and as described in this specification, taken together with the accompanying drawings, in which:

FIG. 6 is a cross sectional view similar to FIG. 3 but showing an alternative embodiment; and FIG. 7 is a cross sectional view taken along the line 7—7 of FIG. 6.

Figure 1:
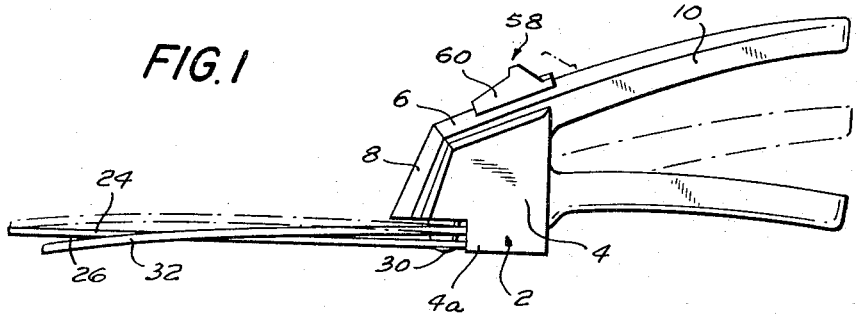
FIG. 1 is a side elevational view of one embodiment of the present invention.

Turning first to the embodiment of FIGS. 1–5, the shears comprises a support housing generally designated 2 having side walls 4, a top wall 6 and a front wall 8. The upper fixed handle 10 of the shears extends rearwardly from the housing 2. The upper front corner of the inside of the housing 2 is preferably solid, as indicated by the reference numeral 12, and a part 14 extends downwardly therefrom, the part 14 having a downwardly extending tip 16 of reduced diameter, an aperture 18 extending through the tip 16 and into the part 14 from the bottom of the tip 16. The lower or shielding portions 4a of the side walls 4 are of reduced length compared to the upper portions thereof. Rear walls 20 extend from the side walls 4, and their opposed edges are separated by a vertical opening 22. All of the parts 4–20 are preferably formed in one piece, as through the use of a die casting or molding operation.

The lower blade 24, provided with a cutting edge 26, has an enlarged rear portion 24a which is received between the housing side wall portions 4a and substantially abuts the housing rear walls 20. It is provided with an aperture 28 through which the tip 16 of the housing part 14 snugly extends. A screw 30 extends up into the aperture 18 and is there secured in any appropriate manner, as by being threaded thereinto. The screw 30 retains the lower blade 24 on the tip 16 of the housing part 14, thereby, in conjunction with the action of the housing walls 4a and 20, maintaining the blade 24 fixed with respect to the housing 2.

The upper blade 32, provided with cutting edge 34, is mounted on top of the lower and fixed blade 24. It is provided at its rear corner opposite the cutting edge with a downwardly extending bump 36 which rides over the blade 24. It is further provided with an aperture 38 through which the tip 16 of the housing part 14 extends, thereby to define an axis about which the blade 32 will pivot between its open position shown in solid lines in FIGS. 1 and 2 and its closed position shown in broken lines in those figures. As here specifically disclosed, and as is preferred, the aperture 38 is somewhat larger than the tip 16, and a bushing 40 is received over the tip 16 and substantially fills the aperture 38. The bushing 40 may be formed of wear-resistant material. It is preferred, as here specifically disclosed, that the outer surface of the bushing 40 be downwardly tapered, for a purpose hereinafter to be described. The height of the bushing 40 is such as to extend from the upper surface of the lower blade 24 to the wide diameter portion of the housing part 14, thereby serving to clamp the lower blade 24 against the head of the screw 30.

A coil spring 42 is received around the housing part 14 and is compressed between the solid portion 12 of the support housing 2 and the upper surface of the blade 32, thus urging the blade 32 down against the blade 24. Because the bump 36 is provided only at one corner of the rear end of the blade 32, that blade will be tilted relative to the blade 24 so as to urge its cutting edge 34 against the cutting edge 26 of the lower blade 24.

The lower handle 44 has a portion 44a which passes through the rear housing opening 22 and is received within the housing 2. The handle portion 44a is pivotally mounted on pin 46 which (see FIG. 5) is received between downwardly extending flanges 48 integral with the housing 2, being secured there in any appropriate manner, as by a press-fit, through the use of a soft melting metal 50 which is solidified therearound after it has been put in place, or in any other appropriate manner. The lower handle 44 is therefore movable in a pivotable fashion about the pin 46 toward and away from the upper handle 10.

The handle portion 44a has a pin 52 extending downwardly therefrom, and preferably provided with a wear-resistant outer bushing 54, that pin and bushing being received in an appropriately oriented and shaped slot 56 formed in the rear portion of the blade 32. As the handle 44 is moved up and down the pin 52 moves rearwardly and forwardly, and the shape of the slot 56 is such that this causes the blade 32 to pivot between closed and open positions respectively.

A lock means generally designated 58 is provided, that means comprising a button 60 accessible at the upper surface of the housing top wall 6 and the handle 10, that button 60 moving a lock member 62 which extends through an elongated slot 64 in the housing top wall 6 into the interior of the housing. The member 62 is provided with a pair of vertically and laterally spaced recesses 64 and 66 which are designed to cooperate with a pin 68 carried by the lower handle 44. The lock member 62 is provided with an extension 70 provided with an upward projection 72 which slides along the undersurface of the handle 10 and is adapted to cooperate with recesses 74, 76 and 78 formed therein. A biasing spring generally designated 80 has a coiled portion 82 extending freely around the pin 46, an arm 84 extending down to and engaging the upper surface of the bottom handle 44, and an arm 86 extending to and engaging the lower surface of the extension 70 of the lock member 62. The resiliency of the spring 80 is such that the arms 84 and 86 tend to spread apart, thereby biasing the lower handle 44 to its lower position, corresponding to a blade-open position, and also biasing the extension 70 of the lock member 62 upwardly so as to urge the projection 72 against the lower surface of the handle 10 and into a recess 74, 76 or 78.

Figure 3:
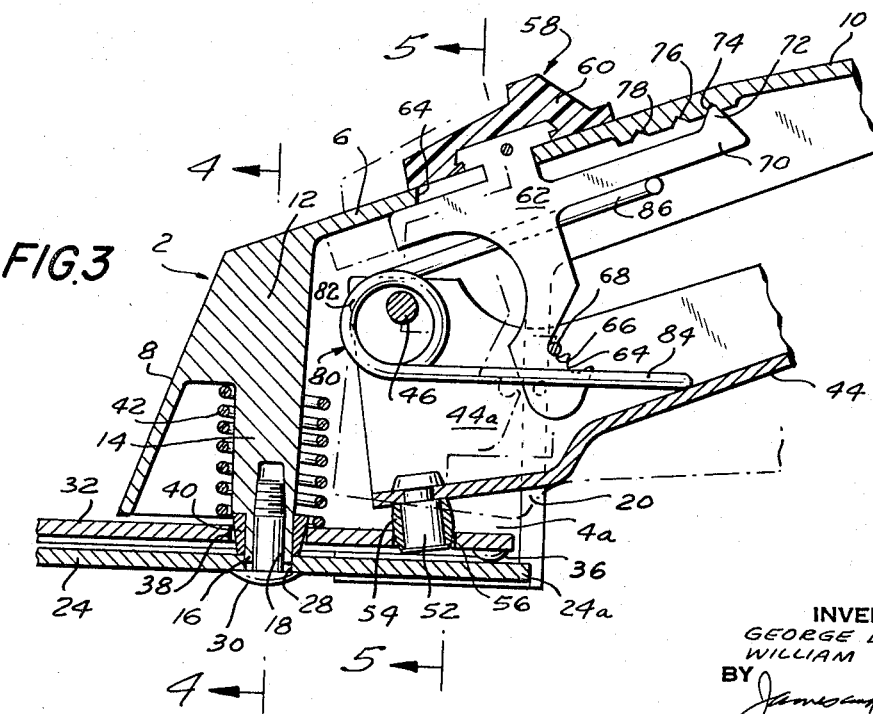
FIG. 3 is a fragmentary cross sectional view on an enlarged scale, taken along the line 3—3 of FIG. 2 and showing the blades and handles locked in closed position.
Figure 5:
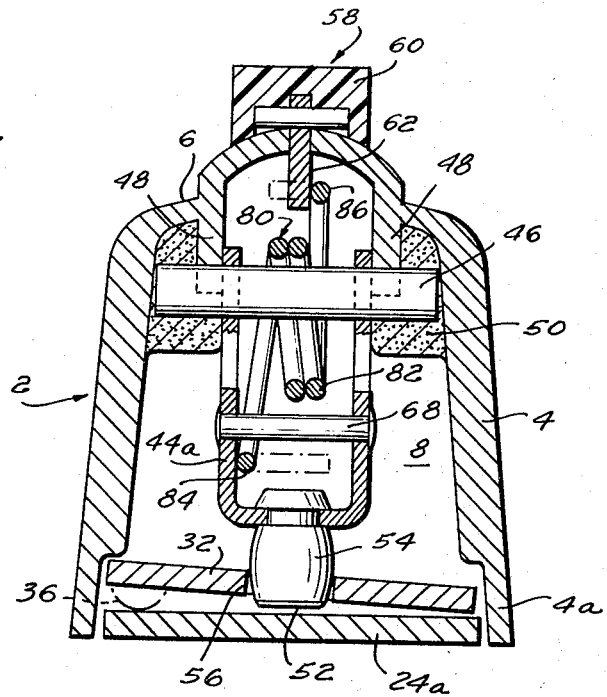
FIG. 5 is a cross sectional view on the scale of FIG. 4 but taken along the line 5—5 of FIG. 3.
Figure 4:
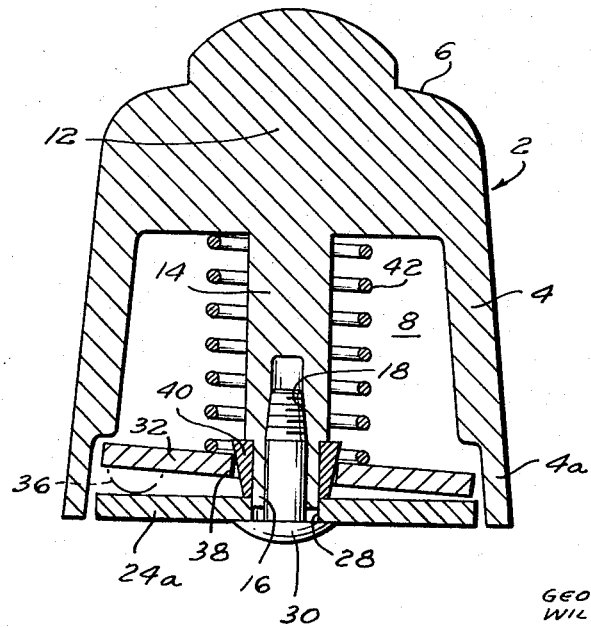
FIG. 4 is a cross sectional view, on a further enlarged scale, taken along the line 4—4 of FIG. 3.

When the handle 44 is moved upwardly toward the handle 10 so as to fully close the blades, the pin 68 carried thereby is at an elevation corresponding to (slightly higher than) the recess 66. If the locking member 62 is then moved to the right, as shown in FIG. 3, the pin 68 will engage in the recess 66, thus locking the blades closed. At the same time the projection 72 on the lock member extension 70 will be urged into recess 74.

If it is desired to permit the blades to open partway the operator, while grasping the handles, may with his thumb, push the button 60 to the left until the projection 72 on the lock member extension 70 snaps into recess 76. At this point the pin 68 will be in line with and will enter the recess 64, thus permitting the handle 44 to move downwardly partway, thereby causing the blades 24 and 32 to spread apart a predetermined amount. If it is desired to open the shears completely the button 60 is pushed to the left until the protrusion 72 engages with the recess 78. This will move the lock member 62 all the way to the left, as indicated by the phantom lines in FIG. 3, and completely out of the way of the pin 68 carried by the handle 44, thus permitting the blades to move to their fully open position as shown in solid lines in FIG. 2.

Figure 2:
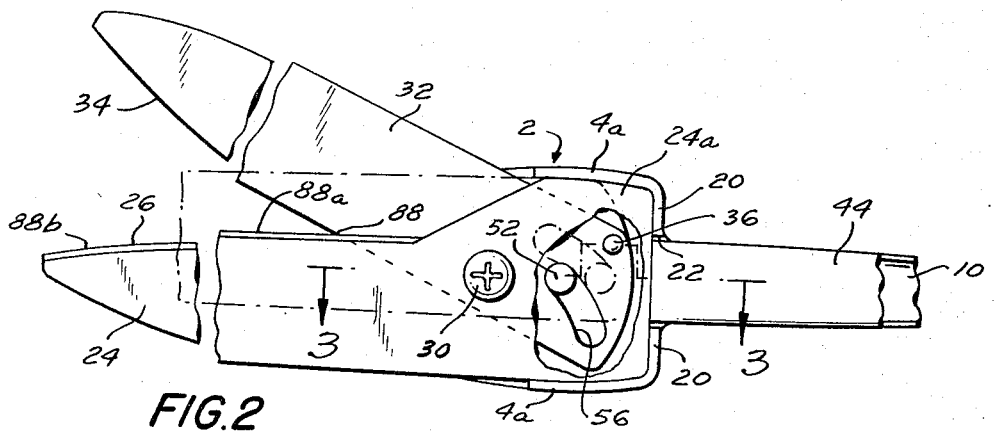
FIG. 2 is a fragmentary bottom plan view thereof.

When the blade 32 is in its open position its cutting edge 34 will engage the cutting edge 26 of the lower blade 24 at point 88 (see FIG. 2). The spring 42, acting on the blade 32 and pressing it downwardly, while at the same time causing it to incline by reason of the bump 36 at one rear corner thereof, will ensure that that engagement will occur. As the handle 44 is moved upwardly toward the handle 10 the blade 32 will be caused to pivot about the bushing 40, and the point of engagement of the cutting edge 34 of the blade 32 with the cutting edge 26 of the blade 24 will move outwardly along that cutting edge 26, as indicated by the exemplary points 88a and 88b in FIG. 2, thereby cutting whatever is interposed between the blades.

If the object interposed between the blades is very weak and flimsy, it will tend to be bent around the cutting edge 26 and interpose itself between the blades. The spring 42 tends to prevent this from occurring by firmly urging the blades against one another. The downwardly tapered outer surface of the bushing 40 cooperates in this action to a significant degree, since for the blade 32 to move upwardly and pass over the object, it must slide up along the bushing 40. The resistance of the object to being cut, as exerted on the blade 32, will tend to cause that blade to move laterally so that an edge of the blade aperture 38 engages the side surface of the bushing 40, and since the portion of that side surface above the blade is radially outwardly disposed relative to the portion of that surface which the blade engages, the bushing will resist that rising movement of the blade. Moreover, within limits, the greater the resistance exerted on the closing action of the blade, the more strongly will the blade be pushed against the outer surface of the bushing 40 and hence the greater will be the effect of the bushing taper in preventing the blade from moving upwardly. However, since the taper is relatively gentle, when an excessive resistance to the closing movement of the blade exists, the upper blade 32 will yield and move upwardly against the action of the spring 42, thus preventing damage to the blades.

The embodiment of FIGS. 6 and 7 is in many respects the same as that of FIGS. 1–5. Accordingly, where appropriate, the parts in the embodiment of FIGS. 6 and 7 comparable to corresponding parts in the embodiment in FIGS. 1–5 will be given similar reference numerals, differentiated, however, by being primed.

The embodiment of FIGS. 6 and 7 primarily differs from that of FIGS. 1–3 in that the portion 44a' of the lower handle 44' is provided with a forwardly extending nose 90 which straddles the downwardly extending housing part 14' and which engages the upper end of the spring 42'. Thus the spring 42' serves two functions. It not only urges the blade 32' downwardly against the blade 34', as in the previously described embodiment, but also urges the handle 44' to pivot about the pin 46' to its down or blade-open position. Hence there is no need, in the embodiment of FIGS. 6 and 7, for a separate spring (the spring 80 of the previously described embodiment) to bias the handles and blades to one extreme operative position. This represents a significant simplification resulting in an appreciable cost reduction.

The construction of FIGS. 6 and 7 has a further advantage. As the point of engagement of the cutting edges moves away from the pivot point of the movable blade 32' from point 88 through part 88a to point 88b (which occurs as the blades move toward their closed position), a given force at that point tending to separate the two blades will, because of the increasing lever arm involved, be effective to compress the spring 42' upwardly and thus permit the upper blade to move upwardly away from the lower blade. In the embodiment of FIGS. 6 and 7, however, as the handle 44' is moved upwardly, thereby causing the blade 32' to move toward its closed position and thereby causing the point of cutting edge engagement to move outwardly, the spring 42' is also compressed, so that it urges the upper blade 32' downwardly against the lower blade 24' with a greater and greater force. This serves to counterbalance the increased lever arm inherent in the outward movement of the point 88, and thus produces a cutting action, and particularly a resistance to obstruction, which is more nearly uniform over the entire range of operation of the shears than was the case with the first described embodiment.

From the above it will be seen that the structures of the present invention are sturdy, simple, and easily assembled from parts which need not be manufactured to any high degree of dimensional precision. In particular, the fixed and movable blades are mounted in such a fashion that they operate more reliably than has previously been the case, particularly with regard to their ability to cut thin flexible articles such as paper or grass without having them bend between the cutting blades and thereby avoid being cut, while at the same time producing an effective safety action permitting the blades to separate when an object of excessive resistance to cutting is met.

While but a limited number of embodiments have been here specifically disclosed, it will be apparent that many variations may be made therein, all within the scope of the instant invention as defined in the following claims.

We claim:

1. A shears comprising a support, a first blade mounted thereon, an element having a downwardly converging outer surface mounted on said support above said first blade, a second blade mounted above said first blade for cutting movement relative thereto between open and closed positions and for a limited degree of vertical movement relative thereto between lower and upper operative positions and having an aperture through which said element passes, said element defining an axis about which said second blade moves relative to said first blade, and means operatively connected between said blades for imparting relative motion thereto, a lower portion of said downwardly tapered element being received within said aperture in said second blade when the latter is in said lower operative position, said lower element portion constituting a loose fit within said aperture.

2. The shears of claim 1, in which said support comprises a housing located at least in part above said blades, said housing comprising a top wall from which a part integral therewith extends downwardly therefrom, said element being mounted on said housing part.

3. The shears of claim 1, in which said support comprises a housing located at least in part above said blades, said housing comprising an integral downwardly projecting part extending substantially to said second blade adjacent the aperture therein and having a tip portion of lesser diameter which extends through said aperture, said element being mounted on said tip portion of said housing part.

4. A shears comprising a support, a first blade mounted thereon, an element having a downwardly converging outer surface mounted on said support above said first blade, a second blade mounted above said first blade for cutting movement relative thereto between open and closed positions and for a limited degree of vertical movement relative thereto between lower and upper operative positions and having an aperture through which said element passes, said element defining an axis about which said second blade moves relative to said first blade, a spring active between said support and said second blade to urge said second blade downwardly toward said first blade, and means operatively connected between said blades for imparting relative motion thereto, a lower portion of said downwardly tapered element being received within said aperture in said second blade when the latter is in said lower operative position, said lower element portion constituting a loose fit within said aperture.

5. The shears of claim 4, in which said support comprises a housing located at least in part above said blades, said housing comprising a top wall from which a part integral therewith extends downwardly therefrom, said element being mounted on said housing part.

6. The shears of claim 4, in which said support comprises a housing located at least in part above said blades, said housing comprising an integral downwardly projecting part extending substantially to said second blade adjacent the aperture therein and having a tip portion of lesser diameter which extends through said aperture, said element being mounted on said tip portion of said housing part.

7. A shears comprising a support housing having a top wall and depending front wall and forward side wall sections having lower edges, a part integral with said top wall and extending down therefrom to a point below said lower edges, a first blade operatively mounted on said part, a second blade operatively mounted on said part above said first blade for movement relative thereto between closed and open positions, both of said blades being below said lower edges of said housing walls, and means operatively connected between said blades and imparting movement thereto.

8. The shears of claim 7, in which the side walls of said housing have shielding sections rearwardly located relative to said forward side wall sections and rearwardly located relative to said downwardly extending housing part, said shielding sections extending down below said lower edges of said forward front wall sections to both sides of and encompassing the sides of the rear portions of said blades and said movement-imparting means.

9. The shears of claim 8, in which said housing has a rear wall extending down substantially similarly to said shielding sections of said side walls to substantially encompass the rear end of the rear portions of said blades and said movement imparting means.

References Cited
UNITED STATES PATENTS

| | | | |
|---|---|---|---|
| 624,175 | 5/1899 | Chapman | 30—270 |
| 2,662,285 | 12/1953 | Yeomans | 30—248 |
| 2,923,058 | 2/1960 | Binkley | 30—248 |
| 2,954,605 | 10/1960 | March et al. | 30—248 |
| 3,036,379 | 5/1962 | Katzfey | 30—248 |
| 3,064,350 | 11/1962 | Wertepny et al. | 30—248 |

WILLIAM FELDMAN, *Primary Examiner.*

J. C. PETERS, *Assistant Examiner.*